Sept. 13, 1955
A. P. KUZNIAR ET AL
2,717,947
NON-INDUCTIVE ELECTRICAL RESISTOR
AND MEANS FOR MOUNTING THE SAME
Filed Feb. 18, 1953
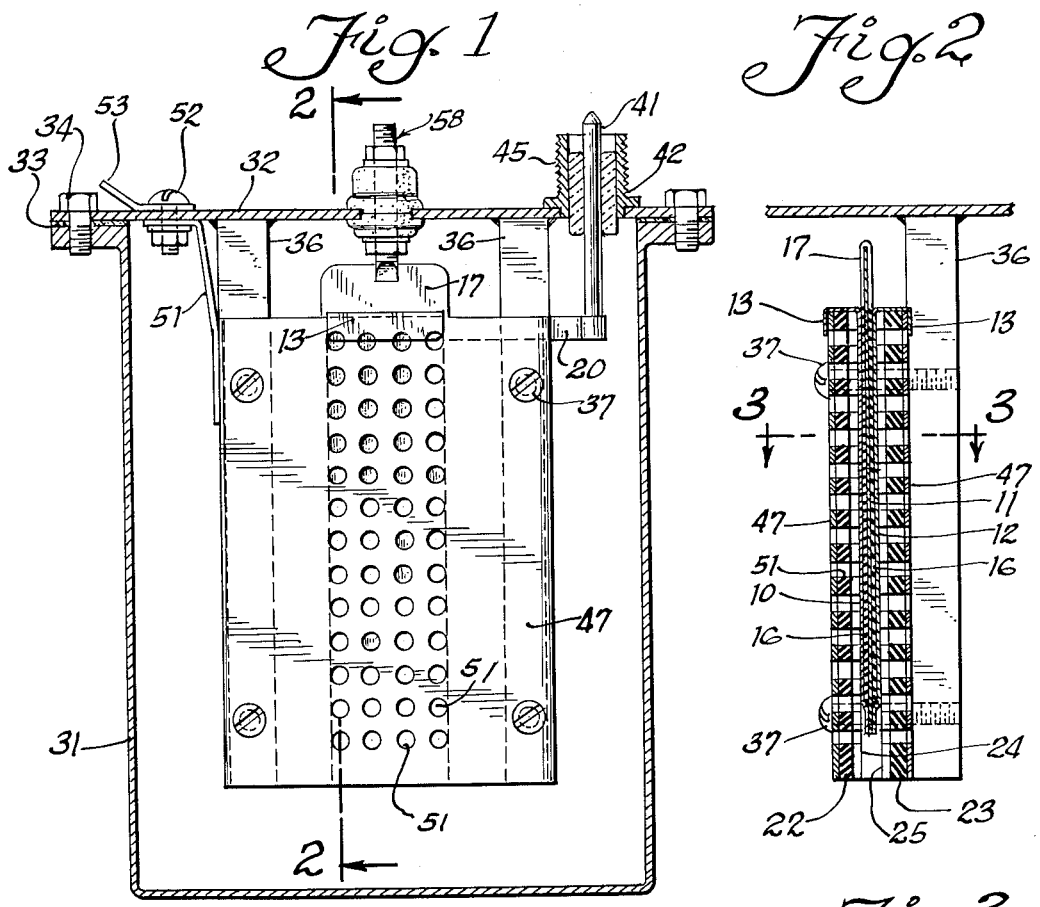
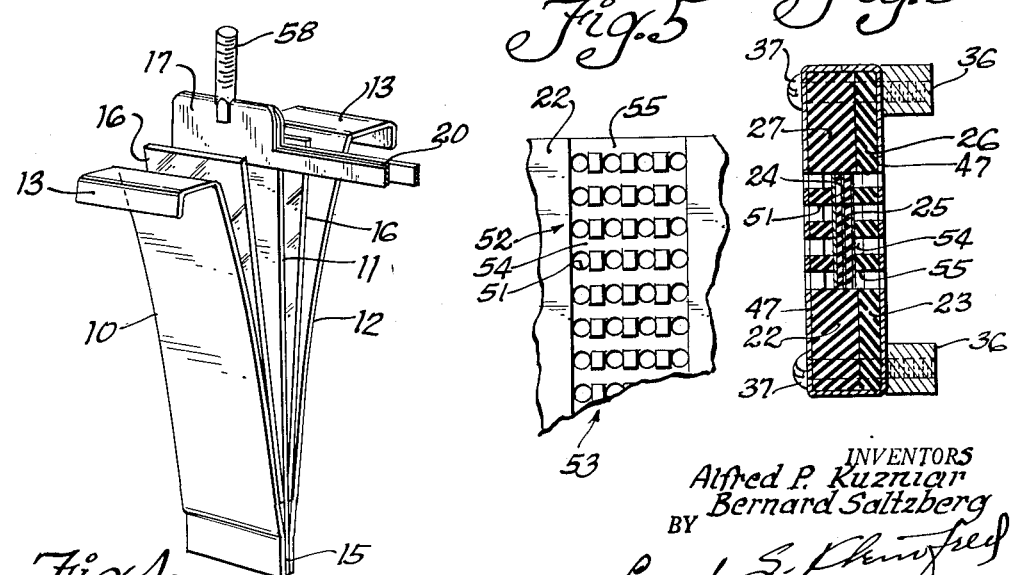
INVENTORS
Alfred P. Kuzniar
Bernard Saltzberg
BY
Leonard S. Khinchfield
Attorney United States Patent Office 2,717,947
Patented Sept. 13, 1955

2,717,947
NON-INDUCTIVE ELECTRICAL RESISTOR AND MEANS FOR MOUNTING THE SAME

Alfred P. Kuzniar and Bernard Saltzberg, Chicago, Ill., assignors to American Television Manufacturing Corporation, Chicago, Ill.

Application February 18, 1953, Serial No. 337,558

14 Claims. (Cl. 201—73)

This invention relates to a so-called "viewing" resistor for measuring the magnitude of the potential in a conductor carrying electrical pulses of relatively high frequency content. More particularly the invention relates to a resistor for providing a potential drop for application to a cathode ray oscilloscope or similar instrument, e. g. a synchroscope, which drop, in magnitude and shape is a veritable counterpart of the actual plus thus to display the wave form of the current pulse in a form suitable for proper measurement and observation. A synchroscope is an oscilloscope provided with a sweep circuit which may be synchronized to an external positive or negative triggering pulse.

By way of example the invention will be described in a typical environment namely, as used for determining the shape of the current pulse in the cathode lead of a hydrogen thyratron. A tube of this character is frequently employed in radar systems and, in one form thereof, the specified width of the pulse along the "time" axis, and as measured in the cathode lead, is 2.5 microseconds, and the specified rate of rise is 5000 amperes per micro-second. The peak value of the current through the cathode is approximately 1000 amperes, and the pulse rate may be as high as 1000 cycles per second. The shape of this pulse is customarily determined by viewing, with a synchroscope, the voltage developed across a resistor inserted in the cathode circuit.

In designing a viewing resistor for the stated purpose, the desired characteristics are found to be generally inconsistent with known forms of resistors. Primarily, a rise of 5000 amperes per micro-second dictates a resistor of extremely low inherent inductance (much below anything commercially available) and this factor necessitates a resistor of small physical dimensions. On the other hand, the resistor must also be capable of dissipating a large amount of power, which is best achieved by making the resistor physically large. These desiderata are antipodal. The rigorous requirement as to non-inductiveness may be clearly recognized by noting that an inductance of as little as one microhenry will, under the exemplificative conditions, produce an inductive overshoot of 5000 volts. Since the pulse being viewed will range from 50 to 100 volts an overshoot of the foregoing magnitude will completely obliterate the pulse.

The present invention comprehends a resistor structure having a geometry such that the inductance L is 0.0004 microhenry or less, which gives rise to an inductive overshoot $$L\frac{di}{dt}$$

of 2 volts or less when $$\frac{di}{dt} = 5000 \text{ amp.}/\mu \text{ sec.}$$

Thus, with the invention resistor, the effect on the pulse to be measured approaches a negligible order of magnitude or at least a magnitude which may be anticipated and reckoned with in viewing the pulse.

A further object resides in providing a mounting for the resistor element which will securely maintain the orientation of its component parts and therefore, the inductance thereof, at a predetermind value.

Another object resides in fulfillment of the foregoing desiderata together with means for effecting the necessary cooling of the resistor elements.

Other objects will appear from the following description which, taken with the accompanying drawings, discloses a preferred mode of carrying the invention into practice, and in which latter:

Fig. 1 is a vertical, medial cross section of a unit embodying the invention;

Fig. 2 is a vertical cross section taken in a plane 90° displaced from the plane of Fig. 1;

Fig. 3 is a cross section taken on the line 3—3 of Fig. 2;

Fig. 4 is a detailed view in perspective of the resistor element proper showing the several components spread apart to reveal details, and Fig. 5 is a detail in elevation to show certain features of the passages for circulating the coolant.

Broadly regarded the invention contemplates a resistance element comprising at least three, thin, flat conductors having the appropriate resistivity joined at one end in parallelly disposed relation and separated by suitable thin, flat insulators of minimum thickness consistent with the anticipated maximum voltage to allow inductive coupling between the elements. The electrical connections are arranged in a manner to cause current flow in the several elements in directions such that the magnetic fields cancel to the greatest possible degree, and the inductance thereby reduced to a negligible figure. The resistor assembly is supported rigidly in a novel mounting intended to preserve the virtually non-inductive disposition as described, and the support is further characterized by means for circulating a cooling fluid about the resistor elements, not only to enable heat to be dissipated in the desirable manner but to maintain the temperature, and hence the resistance of the unit at a predetermined level. Additionally the resistor assembly, including its support, is in turn mounted in a chamber serving as a reservoir for the cooling medium and from which the electrical connections are made in a suitable manner.

In respect to the ensuing description, it will be understood that the "viewing" resistor employed for pulse measurement, in accordance with the embodiment herein disclosed, is customarily inserted in the lead from the cathode of the thyratron to ground. Thus the invention resistor element proper comprises at least three thin, flat sheets 10, 11 and 12 (Fig. 4) of suitable material, e. g. Advance metal, manufactured by Driver-Harris Company, having a cross-section capable of carrying the current for which the resistor is intended, having due regard to the length of the pulse, the frequency thereof and the cooling means to be hereinafter described. The sheets 10, 11 and 12 are positioned in closely, adjacent parallel relation, and are fused over a marginal region 15 by any suitable method and sufficiently to effect a good electrical joint. In order to insulate the several sheets, laminae 16 of mica or equivalent material are interposed therebetween. Each of the sheets 10 and 12 is formed into a return bend 13 at the top thereof for a purpose to appear, while the center sheet 11 has a terminal lug 17 soldered or otherwise fused thereto.

By positioning the sheets 10, 11 and 12 closely adjacent, by maintaining the thickness thereof at a minimum consistent with manufacturing expediency and by so arranging the connections that current is caused to flow in opposite directions in the opposed members the flux linkages thereby resulting substantially cancel. Thus, the inductance of the resistance element proper is reduced to a negligible order of magnitude. In the example the sheets 10, 11 and 12 are 0.0015 inch in thickness and 0.875" in width.

In order that maximum coupling between the adjacent sheets be realized, and cancellation of the opposed fluxes thus enhanced, it is important to maintain the closest possible spacing consistent with the thickness of insulation necessary to avoid breakdown at the working voltage. In the example the thickness of the insulators has been maintained at approximately 0.0025 inch. In accordance with the foregoing it will be noted that the overall thickness of the resistor unit is approximately 0.010 inch and thus incapable of being self-supporting.

By reason of the flaccid character of the assembly shown in Fig. 4 and the necessity of maintaining the predetermined spacing between the several sheets comprising the resistor, and hence the rating, of the resistance, a rigid, clamping-type support is provided. Thus, turning to Figs. 2 and 3, a pair of rigid plates 22 and 23 of insulating material, e. g. plastic composition, are provided. One of these, e. g. the plate 22, is provided with a recess 24 snugly receiving, in a lateral sense, the assembly of Fig. 4 and the other, e. g. the plate 23, is provided with a pad 25 adapted to fit within the recess in the nature of a tongue-and-groove joint and to press against the resistor assembly proper. The depth of the pad and recess are so chosen as to insure that the resistor assembly is firmly clamped therebetween, and while providing some clearance between the confronting surfaces 26 and 27 of the plates 22 and 23, further to insure that such clamping action may be fully realized.

To provide suitable cooling the resistor and its supporting plates 22 and 23 are all carried within a container 31 of any convenient form and necessary volume. After the coolant (not shown) has been added to the container, a cover 32 and gasket 33 are placed in position and screws 34 are tightened to provide a fluid-tight joint. However, since the configuration and detailed construction of the container form no part of the invention per se further elaboration is deemed superfluous. Secured to and depending from the cover 32 is a pair of rigid hangers 36—36 into which a plurality of screws 37 is threaded to secure the resistor and its clamping plates 22 and 23.

Terminal 17 is conveniently provided with two sub-terminals 58 and 20, former for connection to the cathode or other source of current; and the latter for connection to the synchroscope. Both are insulated as shown, ground being the other common connection. Preferably the lateral extension 20 is branched off below the upper terminus of the members 10 and 12, i. e. from a region whereat the flux fields cancel, thus to insure further that the synchroscope receives a non-inductive component. 45 represents the outer sheath of one part of a grounded coaxial connection, this form of transmission line being preferred at the higher frequencies.

The two outer resistor members 10 and 12 are connected to ground in the following manner. Juxtaposed to the plates 22 and 23 is a sheath 47 of brass or other rigid electrically and heat conducting material, the turned over ends 13—13 heretofore specified being arranged to overlie the respective wider faces of the sheath and soldered thereto to effect a suitable electrical connection. The sheath 47 serves also to facilitate conduction of the heat dissipated into the plates 22 and 23 to the coolant.

A strap 51 is soldered to the sheath 47 and is fastened to the cover 32 by a bolt 52 which also secures a lug 53 for connection to any suitable external ground.

The need for clamping the otherwise flaccid resistance element proper between the floor of the recess 24 and the face of the pad 25, and the requirement that the clamping materials be insulators together present an unusual problem of heat dissipation.

To this end we provide, in the plates 22 and 23, in a region substantially co-extensive with the clamped area of the resistance member, as shown in Fig. 4, a plurality of bores 51 preferably arranged in rows 52 and columns 53. Fluid communication between the several bores in a region adjacent the elements 10 and 12 is provided by means of a plurality of lateral channels 54 and a plurality of vertical channels 55. Accordingly, cooling medium surrounding the plates 22 and 23 may circulate freely back and forth through the bores, to and fro in the channels 54, and up and down through the channels 55, thereby to effect efficient dissipation of the heat generated in the resistor to the cooling medium. Moreover, the arrangement of cooling ducts as just described enables circulation of cooling fluid over virtually the entire outer surface of the elements 10 and 12 without diminishing the effectiveness of the clamping action. It will be understood that the sheath 47 is perforated, as at 57, in correspondence with the bores 51.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. An electrical resistor element for providing a potential drop in a conductor carrying pulses of high frequency content and having negligible inductance comprising at least three sheet-like bifacial members of electrically resistive material positioned with their principal faces parallel and closely adjacent, and each member having at least one marginal portion thereof joined to an adjacent marginal portion of the other members to electrically connect said members and to form a multi-leaved resistor, and means at the margins opposite said portions for connecting the resistor in the circuit.

2. An electrical resistor in accordance with claim 1 wherein said members are flat.

3. An electrical resistor in accordance with claim 1 wherein said members are of elongated form and the mutually-joined marginal portions are at one end.

4. An electrical resistor in accordance with claim 1 further characterized by electrically-insulating laminae disposed between the adjacent members.

5. An electrical resistor element for providing a potential drop in a conductor carrying pulses of high-frequency content and having negligible inductance comprising a central thin, bifacial member and second thin, bifacial members, each disposed adjacent a principal face of said central member, all of said members being of electrically-resistive material, said members having at least one marginal portion mutually joined to electrically connect all said members at said margin, and an electrical terminal connected to each member at the margin opposite said other margin, the terminals associated with the second members being commonly connected to constitute one connecting terminal of the resistor and the terminal associated with the central member constituting the other connecting terminal whereby the current flow is in opposite directions in the confronting faces of the members.

6. An electrical resistor in accordance with claim 5 further characterized by electrically insulating laminae interposed between the members.

7. An electrical resistor for providing a potential drop in a conductor carrying pulses of high frequency content and having negligible inductance comprising a thin, flat, elongated central member and a pair of thin, flat, elongated members adjacent thereto and positioned with one face confronting the respective confronting faces of said central member closely adjacent thereto and substantially coextensive therewith, and having a marginal portion electrically connected to a corresponding marginal portion of the central member, electrically insulating means interposed between said members, the material and dielectric strength of said means being so selected as to provide insulating means of minimum thickness at the maximum voltage and therefore the closest possible mechanical spacing between said members, and terminals forming part of said members for connecting the resistor in the circuit.

8. An electrical resistor assembly for providing a potential drop in a conductor carrying pulses of high frequency content and having negligible inductance comprising a resistor unit having a plurality of thin, closely-spaced laminae of electrically-resistive material and electrically-insulating elements intercalated therebetween, means for electrically-connecting said members together, means for connecting said members to a circuit, and means for clamping said unit including a pair of rigid plates, one of said plates having a recess for receiving said members and laminae as a unit and the other thereof having a projection interfitting said recess and arranged to bear on said unit, and means for drawing said plates together to clamp said unit.

9. An electrical resistor assembly for providing a potential drop in a conductor carrying pulses of high frequency content and having negligible inductance comprising a resistor unit including a plurality of electrically-resistive elements having insulating members therebetween together arranged in laminated fashion and being generally thin and flat in overall configuration, means for electrically-connecting said elements in conductive relation, means for connecting said elements to a circuit, and means for clamping said unit including a pair of rigid plates, one of said plates having a recess for receiving said unit and the other thereof having a projection interfitting said recess and arranged to bear on said unit to maintain the several elements and members in pre-determined spaced relation.

10. An electrical resistor assembly in accordance with claim 9 further characterized by fluid-conducting channels in the floor of said recess and adjoining said unit, and means for introducing fluid into said channels for cooling said resistor assembly.

11. An electrical resistor assembly in accordance with claim 9 further characterized by fluid conducting channels in the clamping face of said projection and adjoining said unit, and means for introducing fluid into said channels.

12. An electrical resistor assembly in accordance with claim 10 wherein said fluid-introducing means comprises a plurality of passages in that one of said plates including said recess.

13. An electrical resistor in accordance with claim 11 wherein said fluid-introducing means comprises a plurality of passages in that one of said plates including said projection.

14. An electrical resistor for providing a potential drop in a conductor carrying pulses of high frequency and having negligible inductance comprising a centrally-disposed, thin, member and a pair of adjacent thin members one confronting each face of said centrally-disposed member parallel thereto and having substantially coextensive margins, means for electrically connecting adjacent portions of the respective margins to provide a three-pronged assembly, and insulating laminae filling the space between the members, one electrical terminal of the resistor being associated with the free end of the centrally disposed member, and the other electrical terminal thereof being associated commonly with the free end of each of the other members, the thickness of the members and of the laminae being so selected as to produce mutually cancelling magnetic fluxes in the confronting zones of the members.

References Cited in the file of this patent

UNITED STATES PATENTS 2,487,695     Cloud                 Nov. 8, 1949

FOREIGN PATENTS 535,157      Great Britain         Mar. 31, 1941